Dec. 23, 1930.   M. C. VALENTINE   1,785,847

SCREW MOVING MEANS

Filed Dec. 31, 1928

INVENTOR
M. C. Valentine
BY
C. T. Heinkel
ATTORNEY

Patented Dec. 23, 1930

1,785,847

UNITED STATES PATENT OFFICE

MARY C. VALENTINE, OF CLEVELAND, OHIO

SCREW-MOVING MEANS

Application filed December 31, 1928. Serial No. 329,620.

My invention relates to means for moving screws when the usual operating means thereon are destroyed or broken off.

The object of my invention is to provide an effective means for taking hold of screws for the purpose of rotating the same when the usual operating or rotating means thereof are destroyed or broken off or when only end surface of a screw is available for rotating the same.

Other objects will be pointed out hereinafter, or will become obvious or apparent, or will suggest themselves upon an inspection of the drawing or the specification or both.

In order to convey a good idea of my invention, I have embodied the same in a certain device and show the same in the accompanying drawing and describe the same in detail in this specification. However, I am aware that my invention can be embodied in other devices of a similar nature; therefore, this showing and describing is not intended to be and is not a limitation of my invention.

In the drawing mentioned:—

Similar reference characters refer to similar parts throughout the views.

Figure 1:
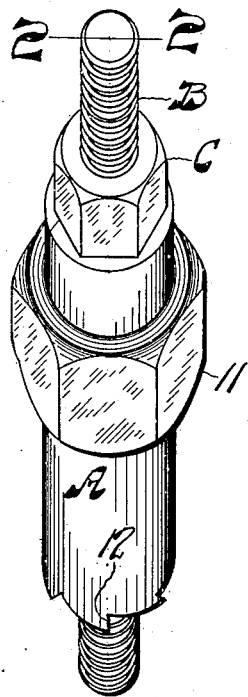
Fig. 1 is a perspective view of an assembled screw moving means embodying my invention.
Figure 2:
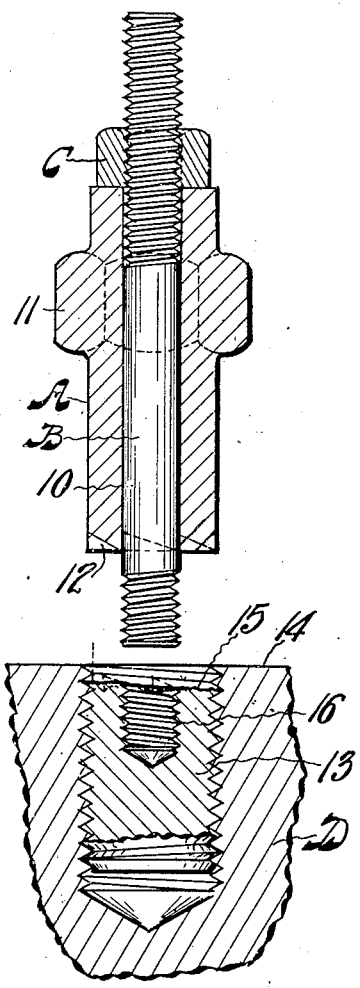
Fig. 2 is a section taken in a longitudinal plane indicated by the line 2—2 in Fig. 1 and shows interior relations of parts more clearly and as applied or in use as a screw removing means.
Figure 3:
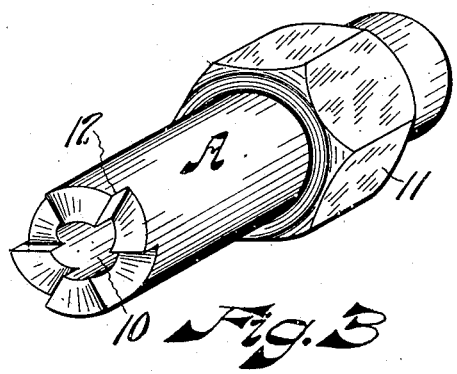
Fig. 3 is a perspective view of the operating member.

Essentially my invention comprises the operating member A, guiding member B and the retaining member C.

The screw moving member A has the hole 10 longitudinally through the same and also has the polygonal part 11 for a wrench or other tool to take hold of the same or other means for the same purpose and also has the teeth 12 on one end face thereof.

The screw connecting member of stud B is threaded on both ends thereof and is extendible through the member A so that the member A can slide longitudinally on the member B as well as to rotate thereon.

The polygonal follow up or adjusting member or nut C is threaded onto one end of the member B.

As to operation and use of the device shown:—

The screw 13 in the part D is broken off in this instance below the surface 14 and thereby leaves the end 15 of the screw concealed below this surface and also leaves this end without any means of taking hold of the same for removing the same from the part D, and is to be removed from the part D.

According to my invention, the hole 16 is first drilled and tapped into the screw and one end of the stud B is then screwed into this tapped hole and thereby forms a fixed connection with the screw.

The member A, herein considered as the operating member, is then telescoped longitudinally over the stud B until the teeth thereon contact the end face 15 of the screw 13.

The member or nut C is then screwed onto the other end of the stud B until it contacts the member A.

A wrench or other rotating means is then applied to the member C to rotate the same with force and thereby force or dig or embed the teeth 12 endwise or longitudinally into the material of the screw.

A wrench or other rotating means is then applied to the member A to rotate the same.

Since the teeth are in a positive contact with material of the screw and since the teeth are held in the material by the nut C, the teeth can not back out of the screw and thereby rotate the screw with the member A and thereby unscrew the screw out of the part D.

In the present instance, the teeth are shown shallow so that the material of the screw plowed up by the teeth will quickly fill the spaces between the teeth and remain there and thereby help to hold the teeth more effectively in contact with material of the screw without permitting the teeth to perform their usual function of cutting material off of an object.

When the screw is very tight in the part D, the rotation of the member A may not rotate the screw by means of the teeth as they were first embedded in the material of the screw and may cause the teeth to cut the material of the screw but, since the teeth can not back out due to the nut C, the teeth will tend to dig in or embed themselves deeper into the material of the screw until the force of the teeth against the material of the screw overcomes the resistance of the tight fit of the screw and thereby rotates and unscrews the same out of the part D.

While the teeth are so digging themselves into the material of the screw when the member A is rotated, a wrench or other rotating means may also be applied to the member C to rotate the same to take up the additional distance traveled longitudinally by the teeth digging in further and force may be applied to rotate the member C so that the same moves the member A longitudinally and thereby forces the teeth further into the material of the screw simultaneously with the rotation of the member A and thereby assists the natural tendency of the teeth to dig in and more effectively take hold of the screw.

The drawing shows the cutting face of the teeth 12 as being parallel with the axis of the device and the faces adjacent to or back of the cutting faces as being angular so that the teeth can dig in further. It is understood that these angular faces may be or should be on opposite sides of the cutting faces according to whether a right or a left hand threaded screw is to be removed. The screw shown in the drawing has a right hand thread; therefore, when a screw with a left hand thread is to be removed, the teeth on the member A should be reversed.

It is obvious that the same sort of a device can also be used for inserting screws when other means for rotating the same are not available.

The device shown and described takes hold of the ends of screws and not internally and thereby does not cause any expansion of the body of the screw to additionally tighten the same in its place and does take hold of ends of screws which have no means thereon of taking hold thereof.

As previously mentioned, I am aware that my invention is applicable to devices other than the one shown and described. I am also aware that changes and modifications can be made in the structure as well as in the arrangement of the parts of the device shown and described; therefore, without limiting myself to the precise application of my invention nor to the precise structure and arrangement of the parts as shown and described,

I claim:—

1. A screw moving means including a member fixable in a screw to be moved, a member rotatable and longitudinally movable on said fixable member and having teeth, and a member movable on said fixable member to move said member with teeth to imbed said teeth into material of said screw and to retain the same therein.

2. A screw moving means including a stud adapted to be fixed to a screw to be moved, a screw moving member rotatable and longitudinally movable on said stud, and a nut threaded onto said stud to move said screw moving member longitudinally on said stud and into engagement with said screw for rotation of said screw upon rotation of said screw moving member.

3. A screw moving means including a stud adapted to be fixed to a broken off part of a screw to be moved, a screw moving member rotatable and longitudinally slidable on said stud and having teeth adapted to engage the screw part, a nut threaded onto said stud in abutting relation to said screw moving member to force said teeth thereon into the material of the screw part, and a take hold means on said screw moving member to rotate the same and thereby rotate the screw part for removal thereof.

In testimony of the foregoing I affix my signature.

MARY C. VALENTINE.